3,122,585
PRODUCTION OF DIMETHYLAMINE-BORANE
William H. Schechter, Tarkio, Mo., and Roy M. Adams, Darlington, and George F. Huff, Fox Chapel, Pa., assignors to Callery Chemical Company, Pittsburgh, Pa., a corporation of Pennsylvania
No Drawing. Filed Sept. 14, 1959, Ser. No. 839,556
4 Claims. (Cl. 260—583)

This invention relates to a method for the production of dimethylamine-borane, $(CH_3)_2NH:BH_3$, and more particularly to a method whereby stable dimethylamine-borane is produced.

This application is a continuation-in-part of our application Ser. No. 392,744, filed November 17, 1953, now United States Patent 2,938,923.

Dimethylamine-borane is a compound containing boron, carbon hydrogen and nitrogen in proportions corresponding to the formula $(CH_3)_2NH:BH_3$. In the prior art there has been reported the preparation of a compound which was thought to be dimethylamine-borane. The art described this compound as being prepared by the reaction of diborane with dimethylamine at —45° C. The compound thus prepared had a melting point of about 11° C., and at room temperature was an unstable, colorless liquid that evolved hydrogen and was easily hydrolyzed by moisture.

We have discovered that the reaction of diborane with dimethylamine under certain conditions produces a stable compound which corresponds to the formula $$(CH_3)_2NH:BH_3$$

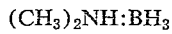

but which has vastly different and greatly superior properties than does the compound of this formula which was known to the prior art. This stable compound is produced when the reaction of diborane with dimethylamine is carried out at temperatures between about 0° C. and 50° C. while maintaining a stoichiometric excess of dimethylamine in the reaction zone. This invention is based on that discovery.

A critical condition which results in the production of the improved, stable dimethylamine-borane is the use of temperatures between about 0° C. and 50° C. in contrast to the very low temperatures used in the prior art which results in the unstable product.

Similarly, a stoichiometric excess of dimethylamine must be maintained during the reaction period. That is, more than two mols of dimethylamine per mol of diborane must be present in the reaction zone at all times in order to produce the stable compound.

It is believed that the stable compound prepared by our method is a different chemical entity than the compound reported as $(CH_3)_2NH:BH_3$ in the prior literature. Thus, while the stable compound which is obtained from the reaction of diborane with dimethylamine in accordance with the herein-described method has the same empirical formula as the compound reported in the literature, it is strikingly different in its properties and utilities. For example, stable dimethylamine-borane when purified has the form of long white needles melting at about 36° C., as compared to a melting point of 11° C. reported for the unstable prior art dimethylamine-borane. The stable compound does not decompose when heated to 110° C., while the unstable compound undergoes considerable decomposition at room temperature (about 25° C.). In contradistinction to the prior art compound, our stable dimethylamine-borane very slowly hydrolyzes in water or in alkaline aqueous solution up to the boiling point of such a solution, and it may be distilled without change in its composition at 59° C. to 65° C. at 2 millimeters mercury pressure. Complete hydrolysis of the stable compound requires one equivalent of acid per gram atom of boron and results in the evolution of 3 mols of hydrogen per gram atom of boron. After hydrolysis the addition of alkali liberates dimethylamine.

The molecular weight of the stable compound as determined experimentally by the freezing point depression in water is 60, with the theory for dimethylamine-borane being 59. The conductance of solutions of the compound indicate it to be of non-ionic character.

Our stable dimethylamine-borane is appreciably soluble in benzene, ethyl ether, chloroform, carbon tetrachloride, toluene, ethanol, acetone, water, ethylene glycol and such nitrogen-containing compounds as liquid ammonia, dimethylamine, pyridine and quinoline.

Our invention will be described further in conjunction with the following examples.

*Example 1*

In this test dimethylamine and diborane were reacted in accordance with the prior art method described by Wiberg et al., Zeit. f. anorg. Chem., vol. 256, pages 285–306. Fifteen grams (0.33 mol) of dimethylamine were condensed into a glass reaction flask and was mixed with 4.7 grams of diborane (0.17 mol) while the temperature was maintained at —42° C. The flask was then connected to a vacuum system and warmed to 0° C. A small amount of unreacted diborane and dimethylamine was removed by vacuum distillation at 0° C. The product was kept at 0° C. and was divided into several portions. One portion was warmed slowly to room temperature and while warming it evolved hydrogen, thus evidencing thermal unstability at temperatures below room temperature. A second portion was mixed with a small amount of water and there was an immediate vigorous reaction liberating hydrogen. The product melted over a several degree range between 11° and 20° C. Its analysis corresponded to that of a compound of the formula $(CH_3)_2NH:BH_3$.

*Example 2*

Diborane and dimethylaimne were reacted in the same manner as in Example 1 except that a stoichiometric excess of dimethylamine, i.e., a mol ratio in excess of 2 mols of dimethylamine per mol of diborane, was maintained throughout the reaction and the temperature at which the reaction was carried out was about 7° C. Analysis of the product which was obtained showed that it had the same empirical formula as the product obtained in Example 1, $(CH_3)_2NH:BH_3$. This product was heated to about 110° C. and gave no evidence of thermal instability. It did not hydrolyze in boiling water and its melting point was 36° C.

As the above examples demonstrate, the reaction product of dimethylamine and diborane when carried out in accordance with the method of this invention has new properties which differ radically from the properties of the product which is obtained from the same reaction when carried out in the manner described in the prior art.

These new properties of our stable dimethylamine-borane permit the use of dimethylamine-borane in applications for which it was wholly unsuited in its unstable form. Thus, for example, the stable form of this compound may be used, as are certain other amine-boranes, as a reducing agent in aqueous solution without loss of hydrogen from hydrolysis, whereas the unstable prior art compound is not only subject to hydrolysis, but cannot be used with any success at temperatures approximating room temperature because of decomposition.

Another use for the amine-boranes is as an additive to liquid hydrocarbon fuels to minimize the effect of metallic or carbonaceous deposits on the operation of internal combustion engines. However, one of the requirements for such a fuel additive is that it be resistant to hydrolysis because the hydrocarbon fuels in which such additives are used normally contain a small amount of water. Thus, because of the resistance which stable dimethylamine-borane exhibits to hydrolysis it is used as a fuel additive, but the unstable form as produced in the prior art method is wholly unsuited for this purpose.

Still another use for the stable form of dimethylamine-borane which is not available for the unstable compound is the process in which dimethylamine-borane is reacted with boron trifluoride at 100° C. to form a mixture of dimethylaminodiborane and dimethylamine borofluoride; the instability of the prior art compound precluded its use in this process.

Furthermore, even those applications in which the unstable prior art compound could be used were not practiced to any extent because of the fact that the unstable compound evolves hydrogen at temperatures below room temperature, thus making it impossible to store and ship this chemical economically. Thus, for practical purposes, dimethylamine-borane, prior to our discovery of the stable form thereof, had no commercial utility. However, the stable compound which we have found can be shipped and stored in the same manner as other shelf chemicals, so that it can be put to various uses, such as those described above, without prohibitive transportation and storage expenses.

In the presently preferred embodiment of our invention, a ten gallon stainless-steel jacketed reactor is used to carry out the reaction of diborane and dimethylamine. The reactor is equipped with provisions for heating and cooling, temperature control, and agitation. In carrying out a run, the reactor is charged with about five gallons of dimethylamine. The temperature is set at the desired starting temperature and maintained by the use of refrigerant or cooling water. The pressure is not critical and is adjusted so as to maintain the dimethylamine in the reactor. Diborane is fed into the agitated reactor at the desired rate until the proper amount of diborane has been added; during the diborane addition the reactor is maintained between about 0° C. and about 50° C. If the temperature at which the run is carried out is below the melting point of stable dimethylamine-borane (36° C.), the reactor temperature is allowed to rise above this temperature during the last portion of the diborane addition in order to prevent the dimethylamine-borane product from solidifying in the reactor. Recovery of the product is carried out by conventional techniques; the product is usually purified in the reactor by a simple vacuum distillation while maintaining the temperature at about 40° C., thus removing the excess dimethylamine which is the only appreciable impurity. Such a vacuum distillation is continued until the reactor pressure is at about 25 inches of mercury for at least sixty minutes and no pressure buildup is noticed when the vacuum pump is closed. When the excess dimethylamine borane has been removed, the product while still in the liquid state is removed and stored in cans at room temperature where it is allowed to crystallize.

The following examples, which were carried out in the aforesaid manner, will serve to illustrate the invention further but should not be construed so as to impose any limitations thereon.

*Example 3*

Twenty-seven and one-half pounds (276 mols) of dimethylamine were charged into the reactor and 6.4 pounds (105 mols) of diborane were added over a period of about ten hours. The temperature was controlled at about 20° C. for the first part of the run and later allowed to rise to 38° C. The pressure reached a maximum of about 7 p.s.i.g. Twenty-five pounds of dimethylamine-borane were obtained in this run representing a yield of about 90%. The melting point of the product was 36° C.

*Example 4*

Two hundred seventy-six mols of dimethylamine were reacted with 130 mols of diborane. The temperature during this run was maintained at about 30° C. and was permitted to increase to about 40° C. just before the product was removed and packaged. Thirty and one-half pounds of dimethylamine-borane, having a melting point of 36.5° C., were obtained. The yield was 91%.

*Example 5*

Twenty-seven and one-half pounds (276 mols) of dimethylamine were charged into the reactor and 7.97 pounds (130 mols) of diborane were added over a period of 10.75 hours. The temperature was controlled at about 40° C. and the maximum pressure reached during the reaction was 41 p.s.i.g. Thirty and one-half pounds of dimethylamine-borane were obtained representing a yield of about 91%. This product melted at about 35° C.

According to the provisions of the patent statutes, we have explained the principle and mode of practicing our invention, and have described what we now consider to be its best embodiments. However, we desire to have it understood that within the scope of the appended claims, the invention may be practiced otherwise than as specifically described.

We claim:

1. A method of producing dimethylamine-borane which comprises reacting diborane with dimethylamine at a temperature between about 0° C. and about 50° C. in the presence of in excess of two mols of dimethylamine per mol of diborane present, said excess being maintained during the entire period of reaction, and recovering the dimethylamine-borane thus formed.

2. A method in accordance with claim 1 in which the excess dimethylamine is removed from the product by vacuum distillation.

3. A method in accordance with claim 1 in which the temperature is above the melting point of dimethylamine-borane during the last part of the reaction period.

4. A method in accordance with claim 1 comprising reacting diborane and dimethylamine at about 7° C., allowing the reaction vessel to warm up naturally from the heat of reaction, and recovering the product.

References Cited in the file of this patent

UNITED STATES PATENTS 2,860,167    Brown _____ Nov. 11, 1958

OTHER REFERENCES

Berg et al.: J. Am. Chem. Soc., volume 71, pages 3451–5 (1949).

Wilberg et al.: Z. anorg. Chem., volume 256, pages 285–306 (1948).